United States Patent
He et al.

(10) Patent No.: US 12,262,222 B2
(45) Date of Patent: Mar. 25, 2025

(54) METHOD FOR REFERENCE SIGNAL DESIGN AND CONFIGURATION

(71) Applicant: ZTE Corporation, Guangdong (CN)

(72) Inventors: Zhen He, Guangdong (CN); Bo Gao, Guangdong (CN); Chuangxin Jiang, Guangdong (CN); Shujuan Zhang, Guangdong (CN); Zhaohua Lu, Guangdong (CN); Ke Yao, Guangdong (CN); Yu Pan, Guangdong (CN); Yang Zhang, Guangdong (CN); Wenjun Yan, Guangdong (CN)

(73) Assignee: ZTE Corporation, Shenzhen (CN)

( * ) Notice: Subject to any disclaimer, the term of this patent is extended or adjusted under 35 U.S.C. 154(b) by 352 days.

(21) Appl. No.: 17/851,835

(22) Filed: Jun. 28, 2022

(65) Prior Publication Data

US 2022/0330044 A1    Oct. 13, 2022

Related U.S. Application Data

(63) Continuation of application No. PCT/CN2020/106315, filed on Jul. 31, 2020.

(51) Int. Cl.
*H04W 16/28* (2009.01)
*H04W 72/1263* (2023.01)
*H04W 72/566* (2023.01)

(52) U.S. Cl.
CPC ....... *H04W 16/28* (2013.01); *H04W 72/1263* (2013.01); *H04W 72/569* (2023.01)

(58) Field of Classification Search
CPC ............... H04W 16/28; H04W 72/569; H04W 72/1263

See application file for complete search history.

(56) References Cited

U.S. PATENT DOCUMENTS

| | | |
|---|---|---|
| 2015/0237642 A1 | 8/2015 | Ihm et al. |
| 2019/0254009 A1 | 8/2019 | Hwang et al. |
| 2019/0373592 A1 | 12/2019 | Ji et al. |
| 2020/0077283 A1* | 3/2020 | Zhou ..................... H04W 24/04 |
| 2020/0221485 A1 | 7/2020 | Cirik et al. |
| 2021/0168779 A1* | 6/2021 | Mondal ................. H04L 5/0035 |
| 2021/0226688 A1* | 7/2021 | Khoshnevisan ...... H04L 5/0092 |

FOREIGN PATENT DOCUMENTS

| | | |
|---|---|---|
| CN | 109787663 A | 5/2019 |
| CN | 110351058 A | 10/2019 |

(Continued)

OTHER PUBLICATIONS

International Search Report and Written Opinion received for Application No. PCT/CN2020/106315 mailed Apr. 25, 2021 (8 pages).

(Continued)

*Primary Examiner* — Duc C Ho

(74) *Attorney, Agent, or Firm* — Crowell & Moring LLP

(57) ABSTRACT

A wireless communication method for use in a wireless terminal is disclosed. The wireless communication method comprises receiving, from the wireless network node, a second signal based on a quasi-co-location assumption of a first signal when at least one event occurs, wherein the first signal and the second signal overlap in at least one time unit.

13 Claims, 8 Drawing Sheets

Prioritize a reception of a first signal when at least one event occurs, wherein the first signal and a second signal overlap in at least one time unit — 1500

(56) References Cited

FOREIGN PATENT DOCUMENTS

WO     WO 2020/146647 A1     7/2020
WO     WO-2020145575 A1 *     7/2020   ............ H04L 5/003

OTHER PUBLICATIONS

Samsung. "On Rel.16 multi-TRP/panel transmission" *3GPP TSG RAN WG1#101-e, R1-2003881,* Jun. 5, 2020 (15 pages).
Extended European Search Report received for Application No. EP 20947668.8 dated Dec. 1, 2022 (11 pages).
Sony: "Considerations on Multi-TRP/Panel Transmission", 3GPP Draft; RI-1912355, 3rd Generation Partnership Project (3gpp), Mobile Competence Centre ; 650, Route Des Lucioles ; F-06921 Sophia-Antipolis Cedex; France, vol. RAN WGI, No. Reno, USA; Nov. 18, 2019-Nov. 22, 2019, Nov. 9, 2019 (4 pp.).
Formality Examination Report (Phase 1) received for Vietnam Application No. 1-2022-04078 dated Mar. 10, 2023, non-English language only (2 pages).
Office Action for China Patent Application No. 202080093981.2 dated Oct. 10, 2024 (8 pp.).

\* cited by examiner

Receive, from the wireless network node, a second signal based on a quasi-co-location assumption of a first signal when at least one event occurs, wherein the first signal and the second signal overlap in at least one time unit — 1300

Receive, from a wireless network node, a second signal based on a TCI state associated with a first signal when at least one event occurs, wherein the first signal and the second signal overlap in at least one time unit — 1400

FIG. 14

Prioritize a reception of a first signal when at least one event occurs, wherein the first signal and a second signal overlap in at least one time unit — 1500

FIG. 15

METHOD FOR REFERENCE SIGNAL DESIGN AND CONFIGURATION

PRIORITY

This application claims priority as a Continuation of PCT/CN2020/106315, filed on Jul. 31, 2020, entitled "METHOD FOR REFERENCE SIGNAL DESIGN AND CONFIGURATION", published as WO 2022/021370 A1, the entirety of which is incorporated herein by reference.

TECHNICAL FIELD

This document is directed generally to wireless communications.

BACKGROUND

In 5G NR, beam forming mechanism is utilized to improve robustness of high frequency communications. Generally, a user equipment (UE) can only use one beam (e.g., reception beam, also called Rx beam) indicated by a gNodeB (gNB) or a network (NW) to receive a downlink (DL) channel or a reference signal (RS) transmitted from the gNB or the NW at a given time instant. In order to improve the reliability and throughput of communication, supporting multiple panels has gradually become an inherent feature of the UE, where a panel refers to a physical antenna panel or an antenna group deployed on the UE side to receive/transmit the DL/UL channel or the RS, and a panel can only form one beam at one time instant.

SUMMARY

This document relates to methods, systems, and devices for reference signal design and configuration.

The present disclosure relates to a wireless communication method for use in a wireless terminal. The wireless communication method comprises: receiving, from the wireless network node, a second signal based on a quasi-colocation assumption of a first signal when at least one event occurs, wherein the first signal and the second signal overlap in at least one time unit.

Various embodiments may implement the following features:

In some embodiments, the at least one event comprises at least one of:

an offset between a physical downlink control channel, PDCCH, scheduling the second signal and the second signal is smaller than a threshold, the first signal is indicated having a transmission configuration indicator, TCI, state, first information associated with the first signal is the same with the first information associated with the second signal, or second information associated with the first signal is the same with the second information associated with the second signal, In some embodiments, the first information comprises at least one of a panel index or a set, and wherein the second information comprises at least one of a control resource set, CORESET, group, a component carrier, CC, or a CC group.

In some embodiments, the panel index is configured in at least one of: a TCI state, a channel state information, CSI, report, a CORESET, a CORESET group, a CC, or a CC group.

In some embodiments, the set comprises at least one of a TCI state or a reference signal, RS.

In some embodiments, the first information associated with the first signal comprises the first information associated with a TCI state applicable to the first signal and the first information associated with the second signal comprises the first information associated with a TCI state applicable to the second signal.

In some embodiments, the TCI state applicable to the first signal comprises a TCI state indicated by downlink control information, DCI, for the first signal, and the TCI state applicable to the second signal comprises at least one of a TCI state indicated by DCI for the second signal, a TCI state activated by a medium access control control element, MAC-CE, for a default CORESET of the second signal, or a TCI state corresponding to the lowest codepoint in a plurality of TCI codepoints comprising a plurality of TCI states applicable to the second signal.

In some embodiments, wherein the first information associated with the first signal comprises the first information associated with an RS applicable to the first signal, and In some embodiments, the first information associated with the second signal comprises the first information is associated with an RS applicable to the second signal.

In some embodiments, the RS applicable to the first signal comprises a QCL RS in a TCI state indicated by DCI for the first signal, and the RS applicable to the second signal comprises at least one of a QCL RS in a TCI state indicated by DCI for the second signal, a QCL RS in a TCI state activated by a MAC-CE for a default CORESET of the second signal, a QCL RS in a TCI state corresponding to the lowest codepoint in a plurality of TCI codepoints comprising a plurality of TCI states applicable to the second signal, or a QCL RS applicable to a default CORESET of the second signal.

In some embodiments, the second information associated with the first signal comprises the second information associated with a CORESET scheduling the first signal, and the second information associated with the second signal comprises at least one of the second information associated with a CORESET scheduling the second signal or the second information associated with a default CORESET of the second signal.

In some embodiments, the first information associated with the first signal comprises the first information associated with the second information associated with the first signal, and wherein the first information associated with the second signal comprises the first information associated with the second information associated with the second signal.

In some embodiments, the first information associated with the second information associated with the first signal comprises the first information associated with the second information associated with a CORESET scheduling the first signal, and the first information associated with the second information associated with the second signal comprises at least one of the first information associated with the second information associated with a CORESET scheduling the second signal or the first information associated with the second information associated with a default CORESET of the second signal.

In some embodiments, one of the first signal or the second signal comprises at least one of a PDCCH, a physical downlink shared channel, PDSCH, a CSI-RS, or an aperiodic CSI-RS.

The present disclosure also relates to a wireless communication method for use in a wireless terminal, the wireless communication method comprising: receiving, from a wireless network node, a second signal based on a transmission configuration indicator, TCI, state associated with a first signal when at least one event occurs, wherein the first signal and the second signal overlap in at least one time unit.

Various embodiments may implement the following features:

In some embodiments, the at least one event comprises at least one of:

an offset between a physical downlink control channel, PDCCH, scheduling the second signal and the second signal is smaller than a threshold, the first signal is indicated having a transmission configuration indicator, TCI, state, first information associated with the first signal is the same with the first information associated with the second signal, or second information associated with the first signal is the same with the second information associated with the second signal, In some embodiments, the first information comprises at least one of a panel index or a set, and wherein the second information comprises at least one of a control resource set, CORESET, group, a component carrier, CC, or a CC group.

In some embodiments, the panel index is configured in at least one of: a TCI state, a channel state information, CSI, report, a CORESET, a CORESET group, a CC, or a CC group.

In some embodiments, the set comprises at least one of a TCI state or a reference signal, RS.

In some embodiments, the first information associated with the first signal comprises the first information associated with a TCI state applicable to the first signal and the first information associated with the second signal comprises the first information associated with a TCI state applicable to the second signal.

In some embodiments, the TCI state applicable to the first signal comprises a TCI state indicated by downlink control information, DCI, for the first signal, and the TCI state applicable to the second signal comprises at least one of a TCI state indicated by DCI for the second signal, a TCI state activated by a medium access control control element, MAC-CE, for a default CORESET of the second signal, or a TCI state corresponding to the lowest codepoint in a plurality of TCI codepoints comprising a plurality of TCI states applicable to the second signal.

In some embodiments, wherein the first information associated with the first signal comprises the first information associated with an RS applicable to the first signal, and In some embodiments, the first information associated with the second signal comprises the first information is associated with an RS applicable to the second signal.

In some embodiments, the RS applicable to the first signal comprises a QCL RS in a TCI state indicated by DCI for the first signal, and the RS applicable to the second signal comprises at least one of a QCL RS in a TCI state indicated by DCI for the second signal, a QCL RS in a TCI state activated by a MAC-CE for a default CORESET of the second signal, a QCL RS in a TCI state corresponding to the lowest codepoint in a plurality of TCI codepoints comprising a plurality of TCI states applicable to the second signal, or a QCL RS applicable to a default CORESET of the second signal.

In some embodiments, the second information associated with the first signal comprises the second information associated with a CORESET scheduling the first signal, and the second information associated with the second signal comprises at least one of the second information associated with a CORESET scheduling the second signal or the second information associated with a default CORESET of the second signal.

In some embodiments, the first information associated with the first signal comprises the first information associated with the second information associated with the first signal, and wherein the first information associated with the second signal comprises the first information associated with the second information associated with the second signal.

In some embodiments, the first information associated with the second information associated with the first signal comprises the first information associated with the second information associated with a CORESET scheduling the first signal, and the first information associated with the second information associated with the second signal comprises at least one of the first information associated with the second information associated with a CORESET scheduling the second signal or the first information associated with the second information associated with a default CORESET of the second signal.

In some embodiments, the TCI state associated with the first signal comprise the first information associated with the TCI state is different from the first information associated with the first signal.

In some embodiments, the first information associated with the TCI state is different from the first information associated with the first signal comprises the first information associated with the TCI state is different from the first information associated with the indicated TCI state applicable to the first signal.

In some embodiments, the TCI state associated with the first signal is associated with a configured set, wherein the configured set associated with the first information or the second information.

In some embodiments, the configured set is provided by a control command, wherein the control command comprises at least one of a radio resource control, RRC, signaling, a media access control control element, MAC-CE, or DCI.

In some embodiments, one of the first signal or the second signal comprises at least one of a PDCCH, a physical downlink shared channel, PDSCH, a CSI-RS, or an aperiodic CSI-RS.

The present disclosure also relates to a wireless communication method for use in a wireless terminal. The wireless communication method comprises: prioritizing a reception of a first signal when at least one event occurs, wherein the first signal and a second signal overlap in at least one time unit.

Various embodiments may implement the following features:

In some embodiments, the prioritizing the reception of the first signal comprises at least one of: receiving only the first signal; or not receiving the second signal.

In some embodiments, the at least one event comprises at least one of:

an offset between a physical downlink control channel, PDCCH, scheduling the second signal and the second signal is smaller than a threshold, the first signal is indicated having a transmission configuration indicator, TCI, state, first information associated with the first signal is the same with the first information associated with the second signal, or second information associated with the first signal is the same with the second information associated with the second signal, In some embodiments, the first information comprises at least one of a panel index or a set, and wherein the second information comprises at least one of a control resource set, CORESET, group, a component carrier, CC, or a CC group.

In some embodiments, the panel index is configured in at least one of: a TCI state, a channel state information, CSI, report, a CORESET, a CORESET group, a CC, or a CC group.

In some embodiments, the set comprises at least one of a TCI state or a reference signal, RS.

In some embodiments, the first information associated with the first signal comprises the first information associated with a TCI state applicable to the first signal and the first information associated with the second signal comprises the first information associated with a TCI state applicable to the second signal.

In some embodiments, the TCI state applicable to the first signal comprises a TCI state indicated by downlink control information, DCI, for the first signal, and the TCI state applicable to the second signal comprises at least one of a TCI state indicated by DCI for the second signal, a TCI state activated by a medium access control control element, MAC-CE, for a default CORESET of the second signal, or a TCI state corresponding to the lowest codepoint in a plurality of TCI codepoints comprising a plurality of TCI states applicable to the second signal.

In some embodiments, wherein the first information associated with the first signal comprises the first information associated with an RS applicable to the first signal, and In some embodiments, the first information associated with the second signal comprises the first information is associated with an RS applicable to the second signal.

In some embodiments, the RS applicable to the first signal comprises a QCL RS in a TCI state indicated by DCI for the first signal, and the RS applicable to the second signal comprises at least one of a QCL RS in a TCI state indicated by DCI for the second signal, a QCL RS in a TCI state activated by a MAC-CE for a default CORESET of the second signal, a QCL RS in a TCI state corresponding to the lowest codepoint in a plurality of TCI codepoints comprising a plurality of TCI states applicable to the second signal, or a QCL RS applicable to a default CORESET of the second signal.

In some embodiments, the second information associated with the first signal comprises the second information associated with a CORESET scheduling the first signal, and the second information associated with the second signal comprises at least one of the second information associated with a CORESET scheduling the second signal or the second information associated with a default CORESET of the second signal.

In some embodiments, the first information associated with the first signal comprises the first information associated with the second information associated with the first signal, and wherein the first information associated with the second signal comprises the first information associated with the second information associated with the second signal.

In some embodiments, the first information associated with the second information associated with the first signal comprises the first information associated with the second information associated with a CORESET scheduling the first signal, and the first information associated with the second information associated with the second signal comprises at least one of the first information associated with the second information associated with a CORESET scheduling the second signal or the first information associated with the second information associated with a default CORESET of the second signal.

In some embodiments, one of the first signal or the second signal comprises at least one of a PDCCH, a physical downlink shared channel, PDSCH, a CSI-RS, or an aperiodic CSI-RS.

The present disclosure relates to a computer program product comprising a computer-readable program medium code stored thereupon, the code, when executed by a processor, causing the processor to implement a wireless communication method recited in any of the foregoing methods.

The embodiment s disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the embodiment s and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

FIG. 14 shows a flowchart of a process according to an embodiment.

FIG. 15 shows a flowchart of a process according to an embodiment.

DETAILED DESCRIPTION

The UE can use multiple beams indicated by the gNB or the NW to receive multiple DL channels or the RSs simultaneously by using multiple panels.

Figure 1A:
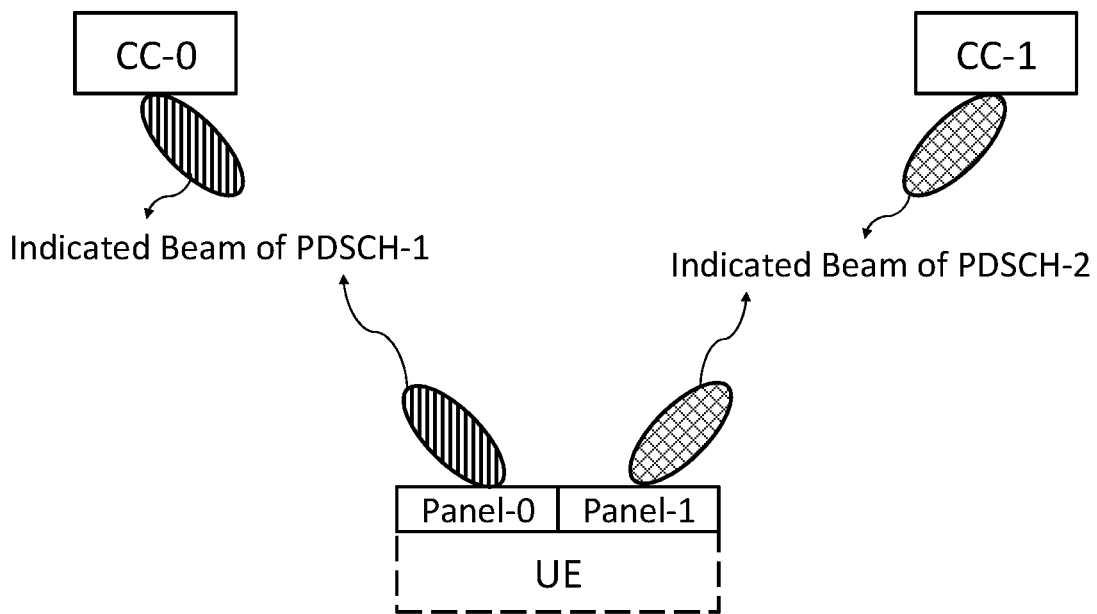
FIG. 1a shows an example of carrier aggregation where a UE uses multiple panels to receive multiple DL channels or RSs simultaneously.
Figure 1B:
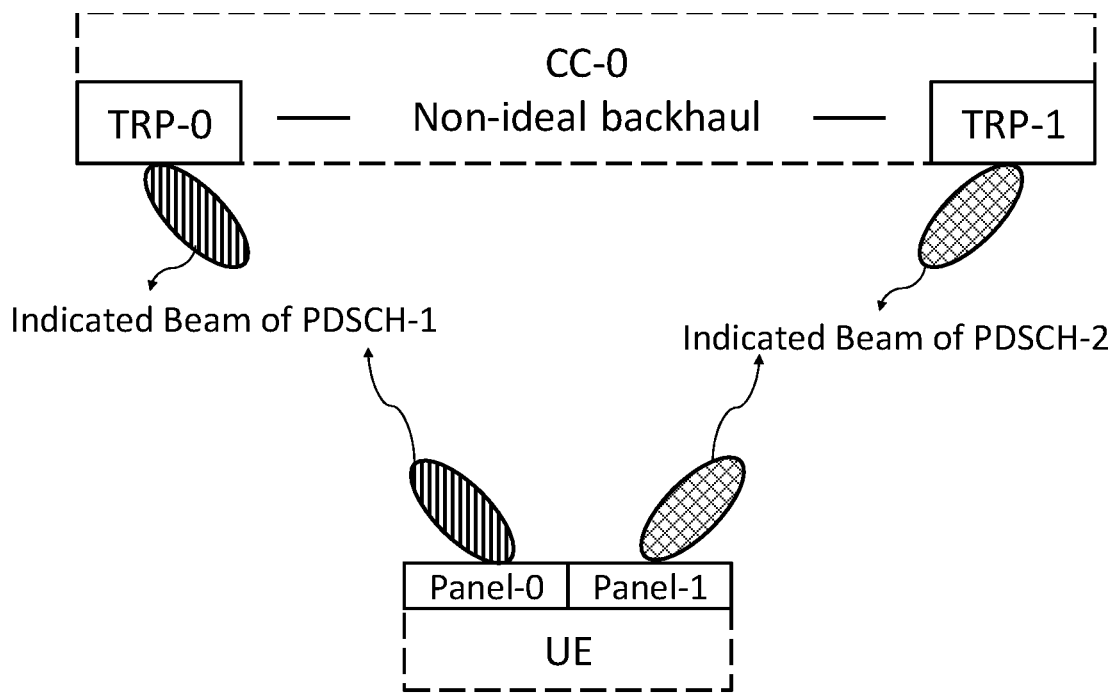
FIG. 1B shows an example of carrier aggregation where a UE uses multiple panels to receive multiple DL channels or RS s simultaneously transmitted from two transmit receive points in a serving cell.

FIGS. 1a and 1b show two examples of carrier aggregation where a UE uses multiple panels to receive multiple DL channels or RSs simultaneously.

For example, as shown in FIG. 1a, in carrier aggregation (CA), the UE can receive simultaneously a PDSCH-1 transmitted from a carrier component (CC-0) and a PDSCH-2 transmitted from a CC-1. Specifically, the indicated beam (left side beam in FIG. 1a) of PDSCH-1 is applied to a panel-0, and the indicated beam (right side beam in FIG. 1a) of PDSCH-2 is applied to a panel-1.

Further, as shown in FIG. 1B, the PDSCH-1 and the PDSCH-2 can also be transmitted from transmit receive points (TRPs) TRP-0 and TRP-1 respectively in a serving cell (e.g., CC-0), where the TRP refers to a physical antenna group (or a panel) to be deployed on the gNB or the NW to transmit/receive the DL/UL channel or the RS.

Figure 2:
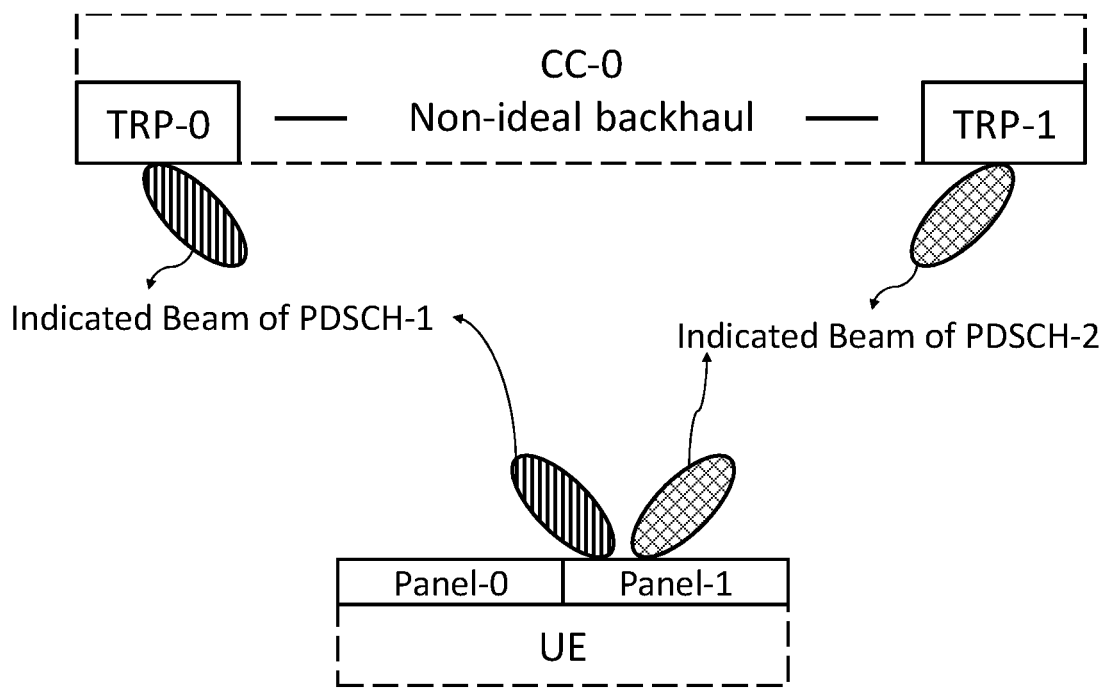
FIG. 2 shows an example in which different beams of different DL channel(s) and RS(s) are associated with the same UE panel at a given time instant.

However, if the different beams of different DL channels and RSs are associated with the same UE panel at a given time instant, e.g., as shown in FIG. 2, the indicated beam of the PDSCH-1 is applied to the panel-1 and the indicated beam of the PDSCH-2 is also applied to panel-1.

FIG. 2 shows an example in which different beams of different DL channel(s) and RS(s) are associated with the same UE panel at a given time instant.

Figure 3:
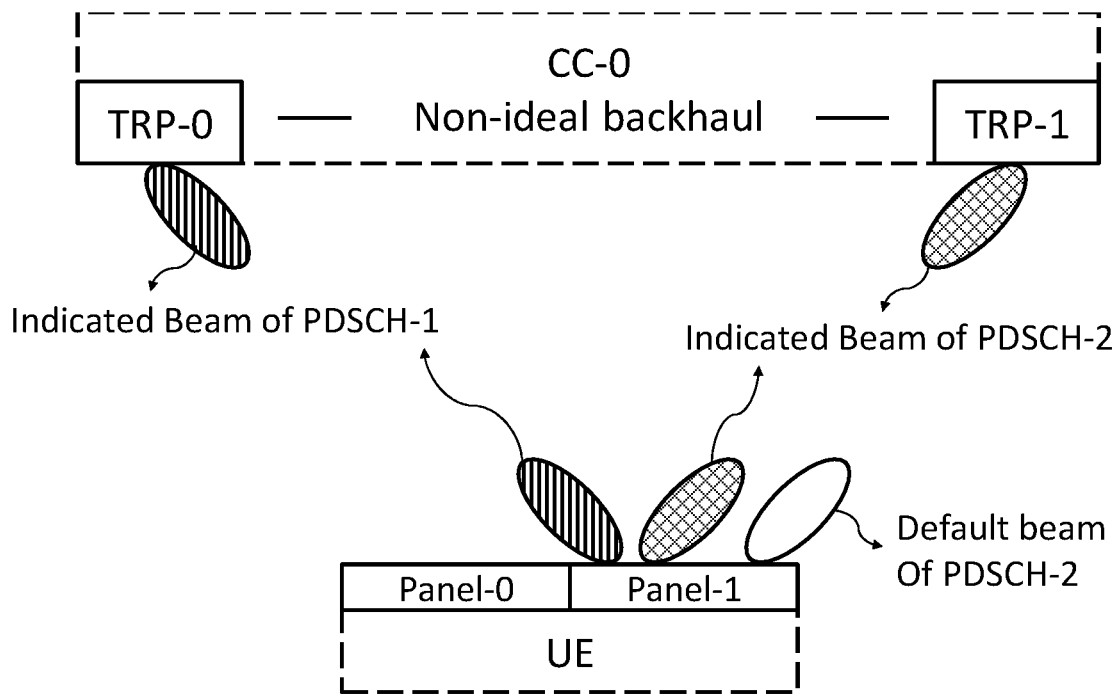
FIG. 3 shows an example of a collision between two beams.

Further, the default beam (e.g., when the UE does not receive the indicated TCI-state, the UE can use the beam applied to the CORESET having the lowest CORESET-ID to receive PDSCH-2) of PDSCH-2 is applied to panel-1, since panel-1 of the UE cannot form two beams to receive PDSCH-1 and PDSCH-2 simultaneously, the UE cannot be clear about its behavior. This is shown in FIG. 3, which shows an example of a collision between two beams.

This collision may cause the UE to fail to receive data normally, thereby affecting communication performance.

At present, there is no effective solution to resolve such collisions.

In view of the above, the UE's antenna group or panel can only form one beam to receive the DL channel or the RS. The UE supporting multiple panels can receive multiple different DL channels and RSs simultaneously.

However, when the different beams of different DL channels and RSs are associated with the same UE's panel at one time instant, the UE cannot be clear about its behavior and cannot receive these DL channels and RSs simultaneously. This collision causes the UE to fail to receive data normally, thereby affecting the communication performance. At present, there is no effective solution to resolve such conflicts.

In the present disclosure, the definition of "transmission configuration indicator (TCI) state" is equivalent to quasi-co-location (QCL) state or QCL assumption. Specifically, "TCI state" is comprised of one or more reference RSs (also called QCL RSs) and their corresponding QCL type parameters, where QCL type parameters include at least one of the following aspects or combinations thereof: Doppler spread, Doppler shift, delay spread, average delay, average gain, and Spatial parameter. For example. QCL type includes "QCL-TypeD", which is used to represent the same or quasi-co "Spatial parameter" between targeted "RS or channel" and the one or more reference QCL-TypeD RSs, in other words, "Spatial parameter" can also be called beam.

In the present disclosure, the term "QCL" or "QCL assumption" includes at least one of the following aspects or combinations thereof: Doppler spread, Doppler shift, delay spread, average delay, average gain, and Spatial parameter.

In the present disclosure, "panel" is equivalent to an antenna group, an antenna port group, a beam group, a sub-array, a UE panel, a transmission entity/unit, or a reception entity/unit.

In the present disclosure, "time unit" may be a sub-symbol, a symbol, a slot, a sub-frame, a frame, a monitoring occasion, or a transmission occasion.

In the present disclosure, the definition of "component carrier (CC)" is equivalent to a serving cell or a bandwidth part (BWP) of a CC.

In the present disclosure, the definition of "CC group" is equivalent to a group including one or more CC(s), and it can be configured by a higher layer configuration (e.g., simultaneousTCI-UpdateList-r16, simultaneousTCI-UpdateListSecond-r16).

In the present disclosure, the definition of "CORESET group index" is equivalent to the index of a group including one or more CORESET(s), and it can be configured by a higher layer configuration (e.g., CORESETPoolIndex).

In the present disclosure, the definition of "panel" or "the UE's panel" is equivalent to a physical (or logical) antenna group (or panel) of the UE.

In the present disclosure, the definition of "threshold" is equivalent to a threshold based on reported UE capability, e.g., beam switching time (timeDurationForQCL or beamSwitchTiming), sub-carrier space (SCS) of the signal and/or beam switching timing delay.

In the present disclosure, "codepoint" occurs A (A is a positive integer) bits in DCI, and each codepoint corresponds to an activated TCI state. For example, "codepoint" can be TCI codepoint, which occurs 3 bits in DCI, and each TCI codepoint (e.g., 000, 001, . . . , 111) corresponds to an activated TCI state applicable to DL signal.

In the present disclosure, for the convenience of description, "the CORESET with the lowest CORESET-ID among CORESETs which are configured with the same CORESET group index as the PDCCH scheduling the second signal, in the latest slot in which the CORESETs within the active BWP of the CC are monitored by the UE" can be called "the default CORESET of the second signal".

In the present disclosure, the definition of "CORESET" is equivalent to a PDCCH or DCI.

In the present disclosure, "symbol" refers to an orthogonal frequency division multiplexing (OFDM) symbol.

In the present disclosure, "A is associated with B" means that A and B have a direct or indirect relationship. It means that A (or B) can be determined according to B (or A).

In the present disclosure, the definition of "CSI-RS" is equivalent to a CSI-RS resource.

Figure 4:
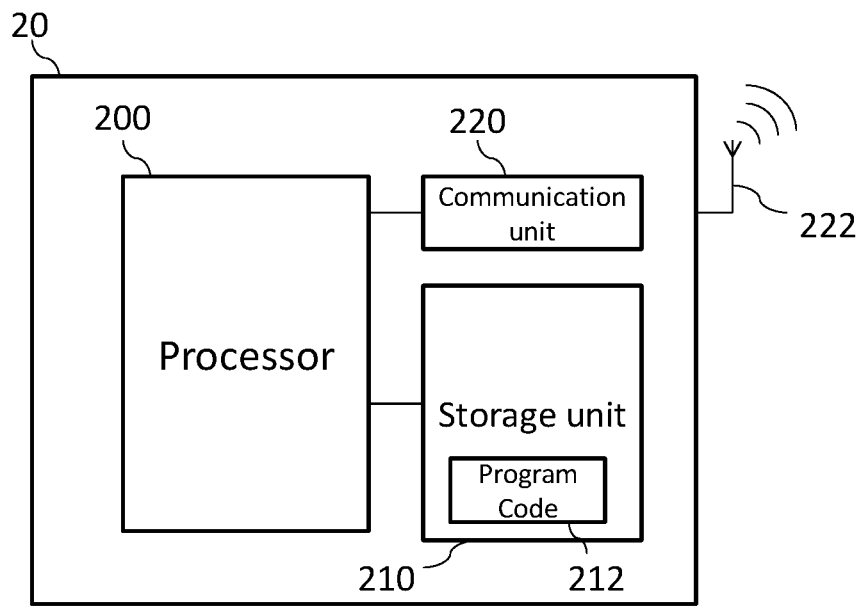
FIG. 4 shows an example of a schematic diagram of a wireless terminal according to an embodiment of the present disclosure.

FIG. 4 relates to a schematic diagram of a wireless terminal 20 according to an embodiment of the present disclosure. The wireless terminal 20 may be a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may be a transceiver and is used to transmit and receive signals (e.g. messages or packets) according to processing results of the processor 200. In an embodiment, the communication unit 220 transmits and receives the signals via at least one antenna 222 shown in FIG. 4.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 5:
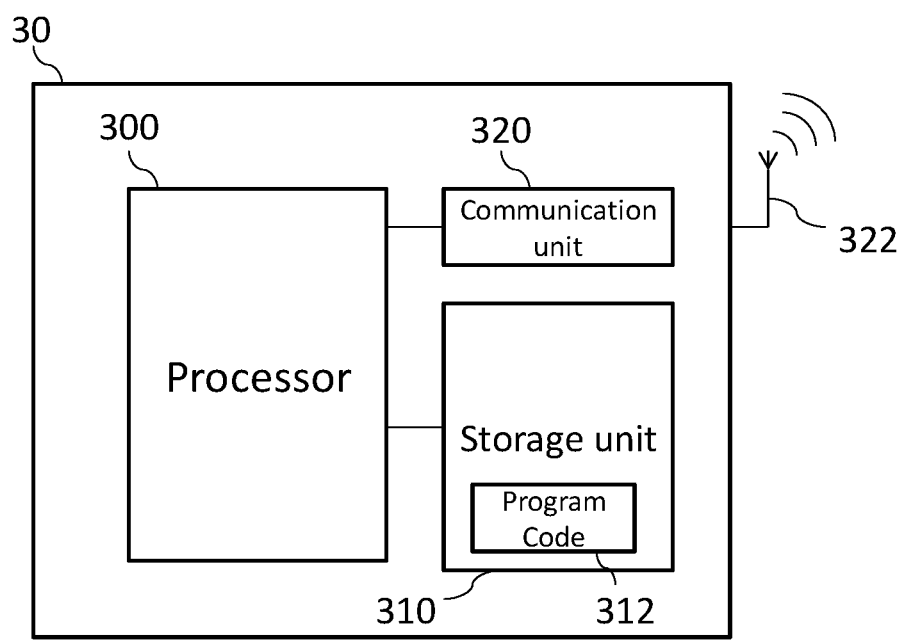
FIG. 5 shows an example of a schematic diagram of a wireless network node according to an embodiment of the present disclosure.

FIG. 5 relates to a schematic diagram of a wireless network node 30 according to an embodiment of the present disclosure. The wireless network node 30 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 30 may comprise (perform) at least one network function such as an access and mobility management function (AMF), a session management function (SMF), a user place function (UPF), a policy control function (PCF), an application function (AF), etc. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 5.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment).

In the following, various embodiments related to clarify the UE's behavior in the collision of any two DL channels or RSs with different beams that applied to (or associated with) the same UE's panel overlap in the same symbol(s), especially, the collision between a PDSCH or CSI-RS and another PDSCH or CSI-RS. The skilled person in the art should acknowledge that these embodiments may be implemented individually or in any possible combination.

In an embodiment, if at least one of the following conditions is met, the UE can apply the QCL assumption of the first signal to the second signal. The conditions comprise the following:

a first signal and a second signal overlap in the same symbol(s);

an offset between the PDCCH scheduling the second signal and the second signal is less than a threshold. Specifically, the scheduling offset between the reception of DL DCI and the corresponding second signal is less than the threshold, wherein the offset refers to one or more time units (e.g., symbols) between the PDCCH scheduling the second signal and the second signal;

there is an indicated TCI state applicable to the first signal. Specifically, the UE receives a TCI state or QCL RS applicable to the first signal indicated by DCI, which implies that the offset between the PDCCH scheduling the first signal and the first signal is less than the threshold;

a first information associated with the first signal is the same as the first information associated with the second signal, where the first information includes at least one of a panel index, a set or a set index. Specifically, the first information can be used to indicate a UE's panel implicitly or explicitly. E.g., the value of the panel index can be used to indicate the UE's panel. The set can be a set of TCI state or RS configured by a higher layer signaling (e.g., RRC). The set includes one or more TCI state(s) or RS(s) and these TCI state or RS(s) are applied or associated with a specific same UE's panel. Different sets are associated with different UE's panels. Similar to the set, the set index refers to the index of the set, which is associated with a TCI state or a RS. The TCI states or RSs associated with the same set index are applied or associated with the same UE's panel. In an embodiment, "the set associated with A" is equivalent to "the set index associated with A";

a second information associated with the first signal is the same as the second information associated with the second signal, where the second information includes at least one of a CORESET group index, a CC or a CC group. Specifically, similar to the first information, the second information can be used to indicate a UE's panel implicitly. Here, "a CC associated with a signal A" means the CC where the signal A is located. In an embodiment, "the CORESET group index/CC index/CC group index associated with A" is equivalent to "the CORESET group/CC/CC group associated with A".

In an embodiment, the UE may be provided the set by a control command, where the control command includes at least one of a higher layer configuration (i.e., RRC signaling), a MAC-CE or DCI.

In an embodiment, "a first information associated with the first signal is the same as the first information associated with the second signal" comprises at least one of the following:

the first information associated with a TCI state applicable to the first signal (i.e., a TCI state indicated by DCI for the first signal) is the same as the first information associated with a TCI state applicable to the second signal. Specifically, the panel index can be configured in a TCI state by using a higher layer signaling (e.g., RRC), alternatively, the panel index may be associated with a TCI state or QCL RS by using a MAC-CE or DCI. Further, the index can also be a group ID which is contained in a CSI report based group, which implies a group ID is associated with a UE's panel implicitly.

Further, the TCI state associated with the second signal includes at least one of the following:

a TCI state activated by a MAC-CE for the default CORESET of the second signal;

a TCI state corresponding to the lowest codepoint among the TCI codepoints containing two different TCI states applicable to the second signal. Specifically, the TCI states are activated by a MAC-CE for the second signal;

the first information associated with the QCL RS applicable to the first signal is the same as the first information associated with the QCL RS applicable to the default CORESET of the second signal. Further, the QCL RS applicable to the second signal includes a QCL RS in the TCI state above mentioned or a QCL RS applicable to the default CORESET (e.g., the SSB the UE identified during random/initial access procedure). Specifically, assume that the QCL-TypeD-RS applicable to the first signal is a CSI-RS, and the QCL-TypeD-RS applicable to the default CORESET is a SSB. Further, the CSI-RS belongs to a configured CSI-RS set-1, and the SSB belongs to a configured SSB set-1, which implies the two RSs (i.e., beams of the first signal and the second signal) are associated with the same UE's panel.

In an embodiment, "a second information associated with the first signal is the same as the second information associated the second signal" comprises at least one of the following:

the second information associated with the CORESET scheduling the first signal is the same as the second information associated with the CORESET scheduling the second signal;

the second information associated with the CORESET scheduling the first signal is the same as the second information associated with the default CORESET of the second signal.

In an embodiment, the first information associated with the second information associated with the CORESET scheduling the first signal is the same as the first information associated with the second information with the CORESET scheduling the second signal. Especially, the first information can be a panel index.

In an embodiment, the first information associated with the second information associated with the CORESET scheduling the first signal is the same as the first information associated with the second information with the default CORESET of the second signal. Especially, the first information can be a panel index.

In an embodiment, the first signal or the second signal includes at least one of the PDSCH or the CSI-RS.

In an embodiment, the CSI-RS includes at least aperiodic CSI-RS.

Embodiment 1

Figure 6:
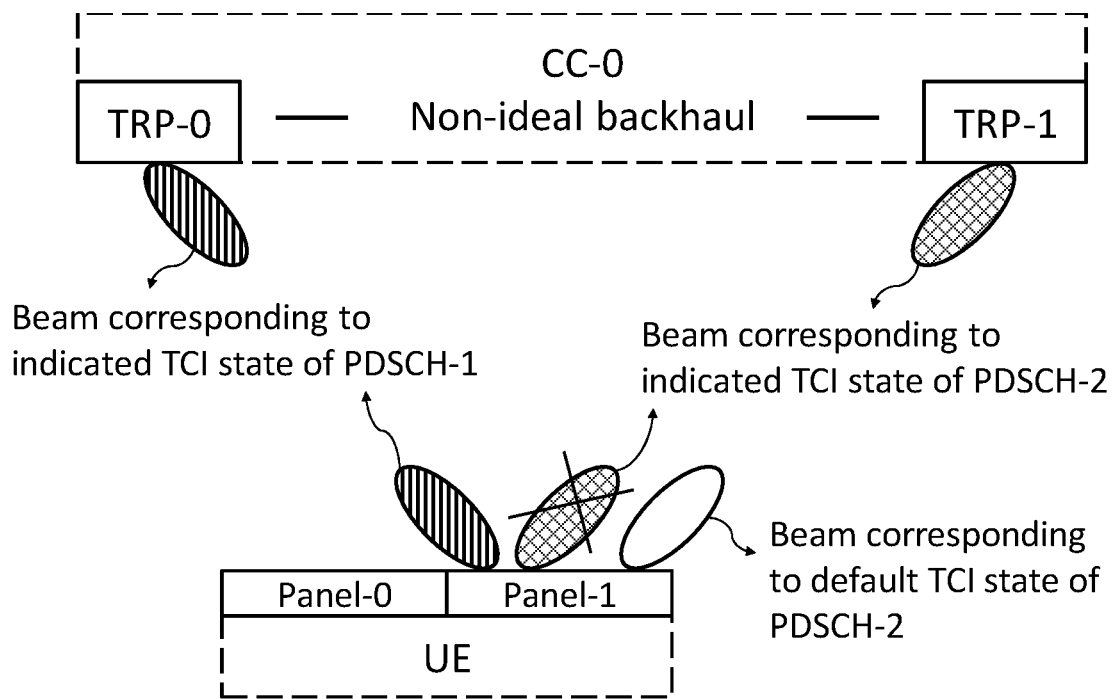
FIG. 6 shows an example of a UE receiving, at a given instant, TCI-state for PDSCH-1 and TCI-state for PDSCH-2.

FIG. 6 shows a schematic diagram of a UE receiving, at a given instant, a TCI-state for a PDSCH-1 and another TCI-state for a PDSCH-2, according to an embodiment of the present disclosure.

In an embodiment, as shown in FIG. 6, in a CC-0, at a given time instant, the gNB indicates a TCI-state for a PDSCH-1 transmitted form a TRP-0 (i.e., first signal), and the beam (i.e., upper/lower left beam) corresponding to the TCI-state is associated with panel ID=1. The gNB indicates a TCI-state for a PDSCH-2 transmitted form a TRP-1 (i.e., second signal), and the beam (i.e., upper right beam) corresponding to the TCI-state is associated with panel ID=1. However, the offset between the reception of the DL DCI (or PDCCH) and the corresponding PDSCH-2 is less than a configured threshold, and thus, the UE may not receive the indicated TCI state (i.e., lower middle beam) of the PDSCH-2 and therefore needs to apply a default beam (i.e., lower right beam) to the PDSCH-2.

Further, the default beam is determined according to the TCI state applicable to the CORESET with the lowest CORESET ID and the TCI state is associated with panel ID=1. The panel ID associated with the indicated TCI state applicable to the PDSCH-1 is the same as the panel ID associated with the default TCI state associated with the PDSCH-2. Meanwhile, the PDSCH-1 and the PDSCH-2 overlap in the same symbol, which may cause a collision (i.e., lower left beam and lower right beam conflict in FIG. 6), because the UE's panel only forms one beam to receive DL signals at a given time instance.

The collision can be resolved effectively by using the method provided by the present invention, i.e., in this case, the UE can apply the QCL assumption (e.g., lower left beam) of the PDSCH-1 to the PDSCH-2.

In the following embodiment s, the lower right beam in the figures is omitted for convenience.

Embodiment 2

Figure 7:
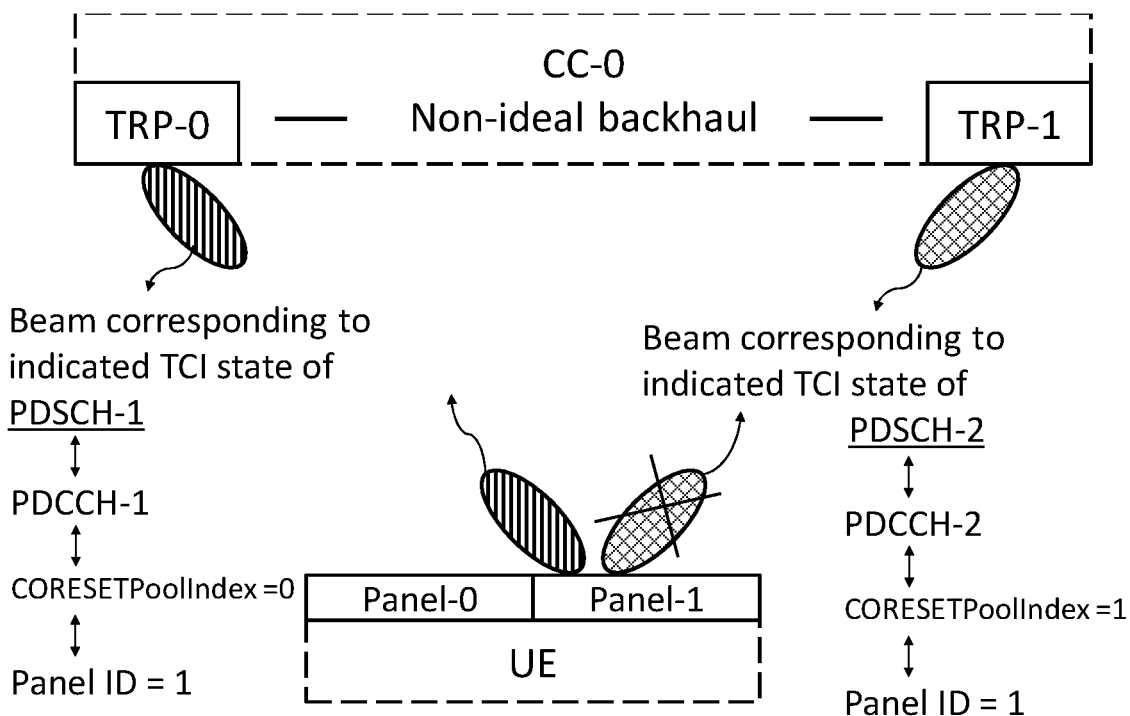
FIG. 7 shows an example of a UE receiving, at a given instant, TCI-state for PDSCH-1 and TCI-state for PDSCH-2.

FIG. 7 shows a schematic diagram of a UE receiving, at a given instant, a TCI-state for a PDSCH-1 and another TCI-state for a PDSCH-2, according to an embodiment of the present disclosure.

In an embodiment, as shown in FIG. 7, in a CC-0, at a given time instant, the gNB indicates a TCI-state for a PDSCH-1 transmitted form a TRP-0 (i.e., first signal) by using a scheduling DL DCI (e.g., a PDCCH-1), and the CORESET group ID (e.g., CORESETPoolIndex) associated with the PDCCH-1 is associated with panel ID=1. The gNB indicates a TCI-state for a PDSCH-2 transmitted form a TRP-1 (i.e., second signal) by using a scheduling DL DCI (e.g., a PDCCH-2), and the CORESET group ID associated with the PDCCH-2 is associated with panel ID=1. The panel IDs associated with the CORESET group IDs associated with the scheduling PDCCHs corresponding to the PDSCH-1 and the PDSCH-2 are the same. Meanwhile, the offset between the reception of the DL DCI (i.e., the PDCCH-2) and the corresponding PDSCH-2 is less than a configured threshold. The PDSCH-1 and the PDSCH-2 overlap in the same symbol. In this case, the UE can apply the QCL assumption (e.g., upper/lower left beam) of PDSCH-1 to the PDSCH-2.

Embodiment 3

Figure 8:
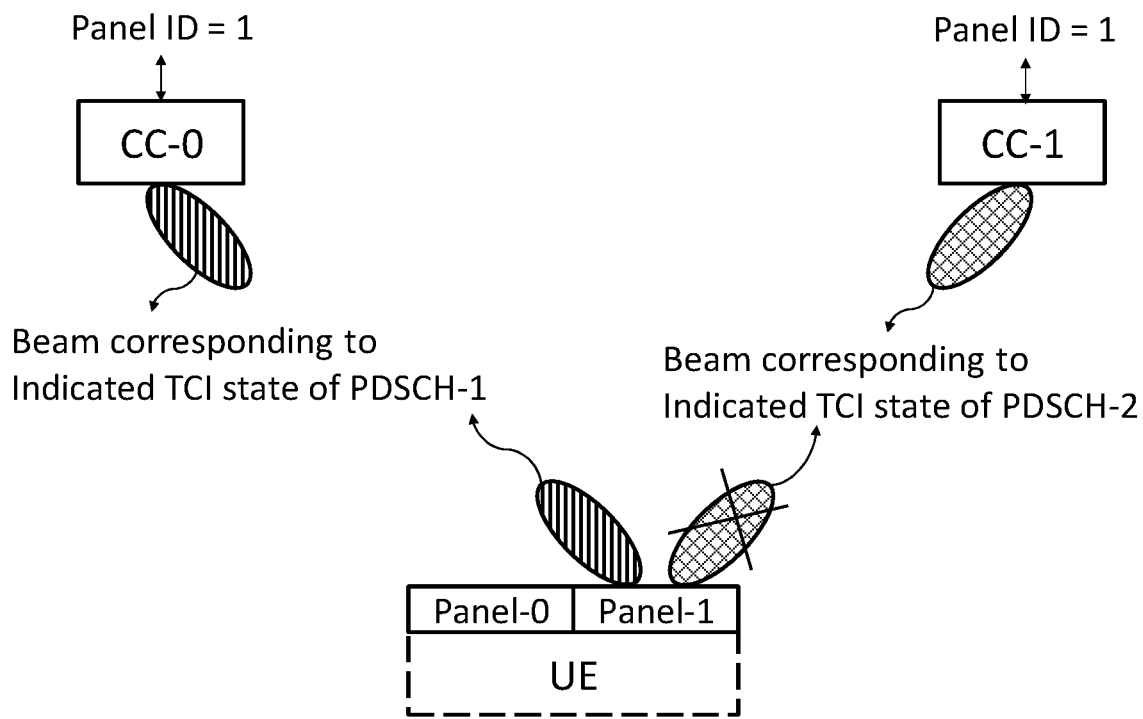
FIG. 8 shows an example of a UE receiving, at a given instant, TCI-state for PDSCH-1 and TCI-state for PDSCH-2 with carrier aggregation (CA).

FIG. 8 shows a schematic diagram of a UE receiving, at a given instant, a TCI-state for a PDSCH-1 and another TCI-state for a PDSCH-2 with carrier aggregation (CA), according to an embodiment of the present disclosure.

In an embodiment, as shown in FIG. 8, in CA, at a given time instant, the gNB indicates a TCI-state for a PDSCH-1 transmitted form a CC-0 (i.e., first signal), and the CC-0 is associated with panel ID=1. The gNB indicates a TCI-state for PDSCH-2 transmitted from a CC-1 (i.e., second signal), and the CC-1 is associated with panel ID=1. The panel IDs associated with the CCs where the PDSCH-1 and the PDSCH-2 are located are the same. Meanwhile, the offset between the reception of the DL DCI and the corresponding PDSCH-2 is less than a configured threshold. The PDSCH-1 and the PDSCH-2 overlap in the same symbol. In this case, the UE can apply the QCL assumption (e.g., upper/lower left beam) of the PDSCH-1 to the PDSCH-2.

Embodiment 4

Figure 9:
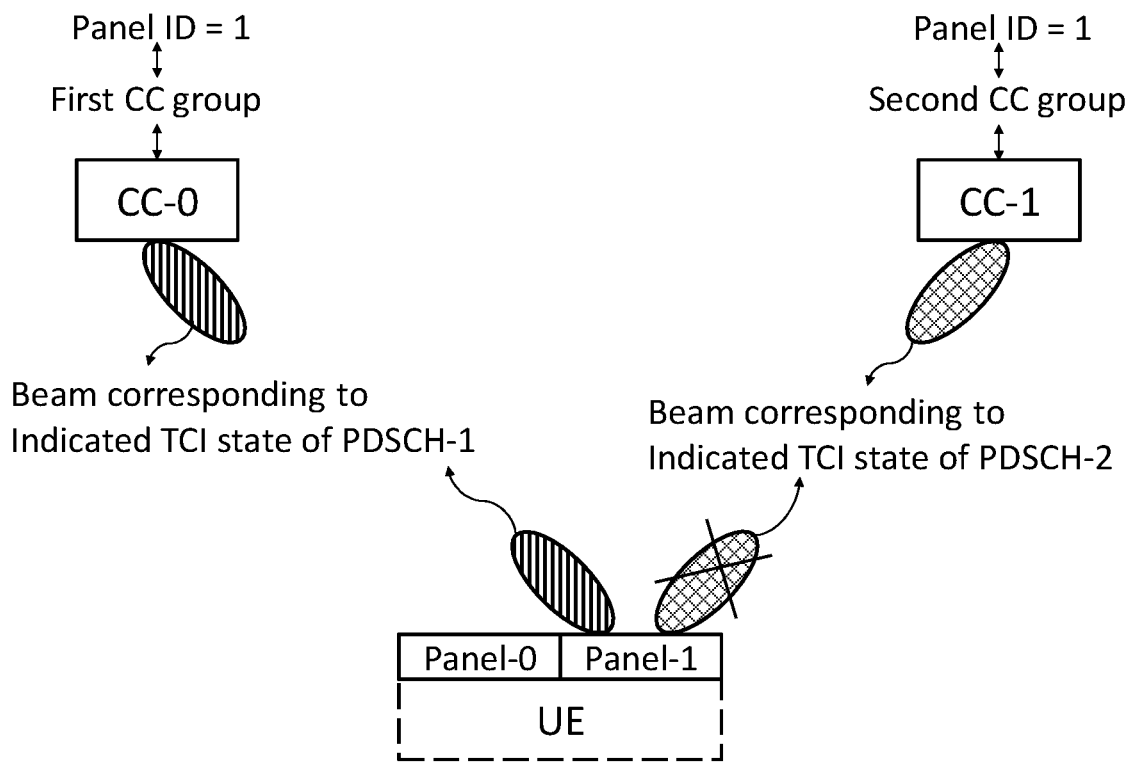
FIG. 9 shows an example of a UE receiving, at a given instant, TCI-state for PDSCH-1 and TCI-state for PDSCH-2 with carrier aggregation (CA).

FIG. 9 shows a schematic diagram of a UE receiving, at a given instant, a TCI-state for a PDSCH-1 and another TCI-state for a PDSCH-2 with carrier aggregation (CA), according to an embodiment of the present disclosure.

In an embodiment, as shown in FIG. 9, in CA, at a given time instant, the gNB indicates a TCI-state for a PDSCH-1 transmitted form a CC-0 (i.e., first signal), where the CC-0 is associated with the first CC group and the first CC group is associated with panel ID=1, where a CC-1 is associated with the second CC group and the second CC group is associated with panel ID=1. The panel IDs associated with the CC group associated with the CCs where the PDSCH-1 and the PDSCH-2 are located are the same. Meanwhile, the offset between the reception of the DL DCI and the corresponding PDSCH-2 is less than a configured threshold. The PDSCH-1 and the PDSCH-2 overlap in the same symbol. In this case, the UE can apply the QCL assumption (e.g., upper/lower left beam) of the PDSCH-1 to the PDSCH-2.

Embodiment 5

Figure 10:
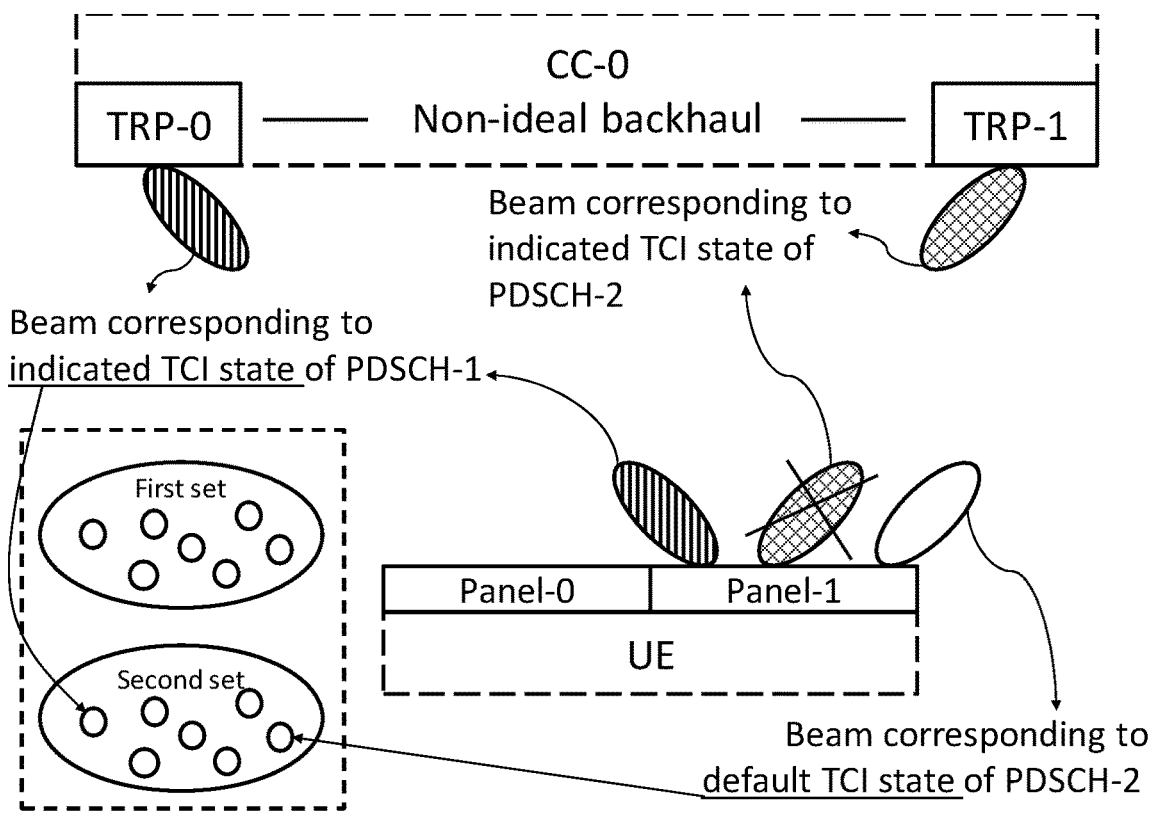
FIG. 10 shows an example of a UE receiving, at a given instant, TCI-state for PDSCH-1 and TCI-state for PDSCH-2.

FIG. 10 shows a schematic diagram of a UE receiving, at a given instant, a TCI-state for a PDSCH-1 and another TCI-state for a PDSCH-2, according to an embodiment of the present disclosure.

As shown in FIG. 10, FIG. 10 reuses the embodiment 1 corresponding to FIG. 6.

In an embodiment, as shown in FIG. 10, it is assumed that in a CC-0, there are two sets provided by a RRC signaling, a MAC-CE and/or DCI: first set and second set, and each set consists of multiple TCI states.

Further, the first set and the second set are associated with a Panel-0 and a Panel-1 respectively. The indicated TCI state applicable to a PDSCH-1 comes from the second set. The default TCI state of a PDSCH-2 comes from the second set. The set associated with the indicated TCI state applicable to the PDSCH-1 is the same as the set associated with the default TCI state associated with the PDSCH-2.

Similar to the embodiment 1, the PDSCH-1 and the PDSCH-2 overlap in the same symbol, which may cause a collision (i.e., upper/lower left beam and lower right beam conflict), because the UE's panel only forms one beam to receive DL signals at a given time instance. The collision can be resolved effectively by using the method provided by the present invention, i.e., in this case, the UE can apply the QCL assumption (e.g., left beam) of the PDSCH-1 to the PDSCH-2.

Embodiment 6

Figure 11:
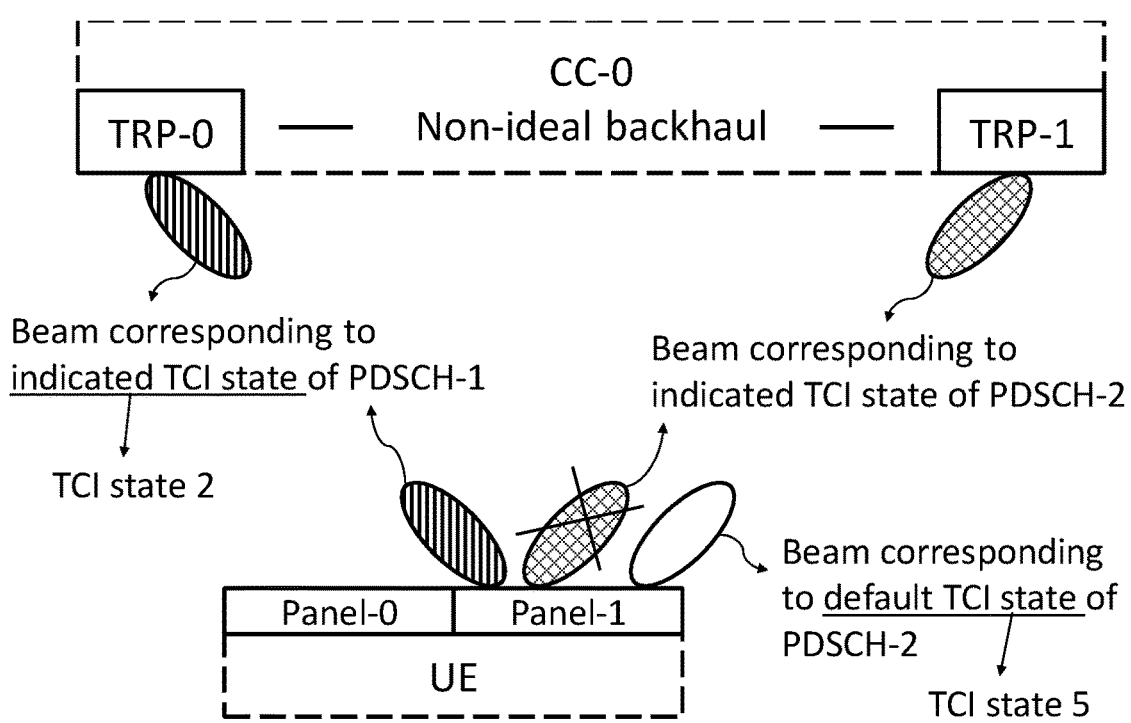
FIG. 11 shows an example of a UE receiving, at a given instant, TCI-state for PDSCH-1 and TCI-state for PDSCH-2.

FIG. 11 shows a schematic diagram of a UE receiving, at a given instant, a TCI-state for a PDSCH-1 and another TCI-state for a PDSCH-2, according to an embodiment of the present disclosure.

As shown in FIG. 11, FIG. 11 reuses the embodiment 1 corresponding to FIG. 6.

In an embodiment, as shown in FIG. 11 it is assumed that in a CC-0, each configured TCI-state is associated with a set index (this association is shown in the following Table I). Further, a set index=0 and a set index=1 are associated with a Panel-0 and a Panel-1, respectively. The indicated TCI state (i.e., TCI state 2) applicable to a PDSCH-1 is associated with set index=1, and the default TCI state of a PDSCH-2 (i.e., TCI-state 5) is associated with set index=1. Therefore, the set index associated with the indicated TCI state applicable to the PDSCH-1 is the same as the set index associated with the default TCI state associated with the PDSCH-2.

TABLE I

| TCI state ID | Associated set index |
|---|---|
| 0 | 0 |
| 1 | 0 |
| 2 | 1 |
| 3 | 1 |
| 4 | 0 |
| 5 | 1 |
| 6 | 0 |
| ... | ... |

Similar to the embodiment 1, the PDSCH-1 and the PDSCH-2 overlap in the same symbol, which may cause a collision (i.e., left beam and right beam conflict), because the UE's panel only form one beam to receive DL signals at a given time instance. The collision can be resolved effectively by using the method provided by this patent, i.e., in this case, the UE can apply the QCL assumption (e.g., left beam) of PDSCH-1 to the PDSCH-2.

In the above embodiment s, when a conflict occurs on one panel, the other panel is likely to be in an idle state. Therefore, in order to further effectively improve the utilization rate of the panel, the following configurations may be considered.

In an embodiment, if the conditions above mentioned apply, the UE may determine the QCL assumption of the second signal according to a TCI state associated with the first signal.

In an embodiment, the TCI state is associated with a configured set (e.g., the TCI state comes from the configured set), wherein the configured set is associated with the first information. Further, the configured set may include one or more TCI state.

In an embodiment, the UE can be provided the configured set by a control command, where the control command includes at least one of a higher layer configuration (i.e., RRC signaling), a MAC-CE or DCI.

In an embodiment, the TCI state associated with the first signal comprises the first information associated with the TCI state is different from the first information associated with the first signal.

In an embodiment, "the first information associated with the TCI state is different from the first information associated with the first signal" comprises at least one of the following: the first information associated with the TCI state is different from the first information associated with the indicated TCI state applicable to the first signal.

Embodiment 7

Figures 12, 13:
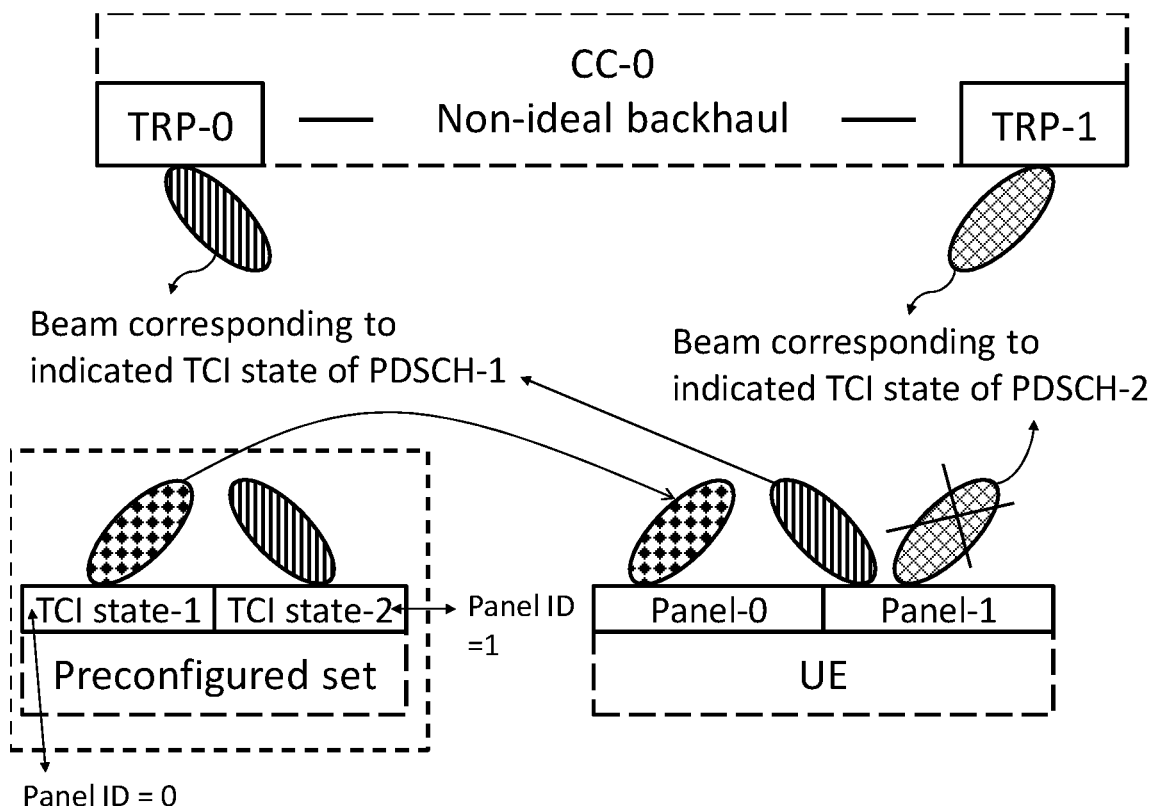
FIG. 12 shows an example of a UE receiving, at a given instant, TCI-state for PDSCH-1 and TCI-state for PDSCH-2.
FIG. 13 shows a flowchart of a process according to an embodiment.

FIG. 12 shows a schematic diagram of a UE receiving, at a given instant, a TCI-state for a PDSCH-1 and another TCI-state for a PDSCH-2, according to an embodiment of the present disclosure.

As shown in FIG. 12, FIG. 12 reuses the embodiment 1 corresponding to FIG. 6.

In an embodiment, as shown in FIG. 12, it is assumed that the UE is provided a pre-configured set including two TCI states: TCI state-1 and TCI state-2, where the TCI state-1 and the TCI state-2 are associated with a panel-ID=0 and a panel-ID=1, respectively. Further, the pre-configured set can be configured by an RRC signaling, a MAC-CE or DCI. The TCI state corresponding to the lower left beam with different panel-ID associated with the lower right beam (i.e., PDSCH-1) is the TCI state-1. Therefore, in this case, the UE can determine the beam of the PDSCH-2 according to the TCI state-1 (i.e., lower left beam).

In one embodiment, if the conditions above mentioned apply, the UE is expected to prioritize the reception of the first signal. Specifically, the UE may receive only the first signal but not the second signal.

FIG. 13 shows a flowchart of a process according to an embodiment of the present disclosure. The process shown in FIG. 13 may be used in a wireless terminal (e.g. UE) and comprises the following step:

Step 1300: Receive, from the wireless network node, a second signal based on a quasi-co-location assumption of a first signal when at least one event occurs, wherein the first signal and the second signal overlap in at least one time unit.

In the process shown in FIG. 13, the wireless terminal receives, from a wireless network node (e.g. BS), a second signal based on a quasi-co-location assumption of a first signal when at least one event occurs. In this embodiment, the first signal and the second signal overlap in at least one time unit.

In an embodiment, the at least one event comprises at least one of:
an offset between a PDCCH scheduling the second signal and the second signal is smaller than a threshold,
the first signal is indicated having a TCI state,
first information associated with the first signal is the same with the first information associated with the second signal, or
second information associated with the first signal is the same with the second information associated with the second signal.

The first information comprises at least one of a panel index or a set.

The second information comprises at least one of a CORESET group, a CC or a CC group.

In an embodiment, the panel index is configured in at least one of: a TCI state, a CSI report, a CORESET, a CORESET group, a CC, or a CC group.

In an embodiment, the set comprises at least one of a TCI state or an RS.

In an embodiment, the first information associated with the first signal comprises the first information associated with a TCI state applicable to the first signal.

In an embodiment, the first information associated with the second signal comprises the first information associated with a TCI state applicable to the second signal.

In an embodiment, the TCI state applicable to the first signal comprises a TCI state indicated by downlink control information, DCI, for the first signal.

In an embodiment, the TCI state applicable to the second signal comprises at least one of a TCI state indicated by DCI for the second signal, a TCI state activated by a MAC-CE for a default CORESET of the second signal, or a TCI state corresponding to the lowest codepoint in a plurality of TCI codepoints comprising a plurality of TCI states applicable to the second signal.

In an embodiment, the first information associated with the first signal comprises the first information associated with an RS applicable to the first signal.

In an embodiment, the first information associated with the second signal comprises the first information is associated with an RS applicable to the second signal.

In an embodiment, the RS applicable to the first signal comprises a QCL RS in a TCI state indicated by DCI for the first signal.

In an embodiment, the RS applicable to the second signal comprises at least one of a QCL RS in a TCI state indicated by DCI for the second signal, a QCL RS in a TCI state activated by a MAC-CE for a default CORESET of the second signal, a QCL RS in a TCI state corresponding to the lowest codepoint in a plurality of TCI codepoints comprising a plurality of TCI states applicable to the second signal, or a QCL RS applicable to a default CORESET of the second signal.

In an embodiment, the second information associated with the first signal comprises the second information associated with a CORESET scheduling the first signal.

In an embodiment, the second information associated with the second signal comprises at least one of the second information associated with a CORESET scheduling the second signal or the second information associated with a default CORESET of the second signal.

In an embodiment, the first information associated with the first signal comprises the first information associated with the second information associated with the first signal, and wherein the first information associated with the second signal comprises the first information associated with the second information associated with the second signal.

In an embodiment, the first information associated with the second information associated with the first signal comprises the first information associated with the second information associated with a CORESET scheduling the first signal.

In an embodiment, the first information associated with the second information associated with the second signal comprises at least one of the first information associated with the second information associated with a CORESET scheduling the second signal or the first information associated with the second information associated with a default CORESET of the second signal.

In an embodiment, one of the first signal or the second signal comprises at least one of a PDCCH, a PDSCH, a CSI-RS, or an aperiodic CSI-RS.

FIG. 14 shows a flowchart of a process according to an embodiment of the present disclosure. The process shown in FIG. 14 may be used in a wireless terminal (e.g. UE) and comprises the following step:

Step 1400: Receive, from a wireless network node, a second signal based on a TCI state associated with a first signal when at least one event occurs, wherein the first signal and the second signal overlap in at least one time unit.

In the process shown in FIG. 14, the wireless terminal receives, from a wireless network node (e.g. BS), a second signal based on a TCI state associated with a first signal when at least one event occurs. Note that the first signal and the second signal overlap in at least one time unit.

In an embodiment, the at least one event comprises at least one of:
an offset between a PDCCH scheduling the second signal and the second signal is smaller than a threshold,
the first signal is indicated having a TCI state,
first information associated with the first signal is the same with the first information associated with the second signal, or
second information associated with the first signal is the same with the second information associated with the second signal.

The first information comprises at least one of a panel index or a set.

The second information comprises at least one of a CORESET group, a CC or a CC group.

In an embodiment, the panel index is configured in at least one of: a TCI state, a CSI report, a CORESET, a CORESET group, a CC, or a CC group.

In an embodiment, the set comprises at least one of a TCI state or an RS.

In an embodiment, the first information associated with the first signal comprises the first information associated with a TCI state applicable to the first signal.

In an embodiment, the first information associated with the second signal comprises the first information associated with a TCI state applicable to the second signal.

In an embodiment, the TCI state applicable to the first signal comprises a TCI state indicated by downlink control information, DCI, for the first signal.

In an embodiment, the TCI state applicable to the second signal comprises at least one of a TCI state indicated by DCI for the second signal, a TCI state activated by a MAC-CE for a default CORESET of the second signal, or a TCI state corresponding to the lowest codepoint in a plurality of TCI codepoints comprising a plurality of TCI states applicable to the second signal.

In an embodiment, the first information associated with the first signal comprises the first information associated with an RS applicable to the first signal.

In an embodiment, the first information associated with the second signal comprises the first information is associated with an RS applicable to the second signal.

In an embodiment, the RS applicable to the first signal comprises a QCL RS in a TCI state indicated by DCI for the first signal.

In an embodiment, the RS applicable to the second signal comprises at least one of a QCL RS in a TCI state indicated by DCI for the second signal, a QCL RS in a TCI state activated by a MAC-CE for a default CORESET of the second signal, a QCL RS in a TCI state corresponding to the lowest codepoint in a plurality of TCI codepoints comprising a plurality of TCI states applicable to the second signal, or a QCL RS applicable to a default CORESET of the second signal.

In an embodiment, the second information associated with the first signal comprises the second information associated with a CORESET scheduling the first signal.

In an embodiment, the second information associated with the second signal comprises at least one of the second information associated with a CORESET scheduling the second signal or the second information associated with a default CORESET of the second signal.

In an embodiment, the first information associated with the first signal comprises the first information associated with the second information associated with the first signal, and wherein the first information associated with the second signal comprises the first information associated with the second information associated with the second signal.

In an embodiment, the first information associated with the second information associated with the first signal comprises the first information associated with the second information associated with a CORESET scheduling the first signal.

In an embodiment, the first information associated with the second information associated with the second signal comprises at least one of the first information associated with the second information associated with a CORESET scheduling the second signal or the first information associated with the second information associated with a default CORESET of the second signal.

In an embodiment, the TCI state associated with the first signal comprise the first information associated with the TCI state is different from the first information associated with the first signal.

In an embodiment, the first information associated with the TCI state is different from the first information associated with the first signal comprises the first information associated with the TCI state is different from the first information associated with the indicated TCI state applicable to the first signal.

In an embodiment, the TCI state associated with the first signal is associated with a configured set, wherein the configured set associated with the first information or the second information.

In an embodiment, the configured set is provided by a control command, wherein the control command comprises at least one of an RRC, signaling, a MAC-CE or DCI.

In an embodiment, one of the first signal or the second signal comprises at least one of a PDCCH, a PDSCH, a CSI-RS, or an aperiodic CSI-RS.

FIG. 15 shows a flowchart of a process according to an embodiment of the present disclosure. The process shown in FIG. 15 may be used in a wireless terminal (e.g. UE) and comprises the following step:

Step 1500: Prioritize a reception of a first signal when at least one event occurs, wherein the first signal and a second signal overlap in at least one time unit.

In the process shown in FIG. 15, the wireless terminal may prioritize a reception of a first signal when at least one event occurs, e.g., when the first signal and a second signal overlap in at least one time unit.

In an embodiment, the prioritizing the reception of the first signal comprises at least one of receiving only the first signal or not receiving the second signal.

In an embodiment, the at least one event comprises at least one of:
an offset between a PDCCH scheduling the second signal and the second signal is smaller than a threshold,
the first signal is indicated having a TCI state,
first information associated with the first signal is the same with the first information associated with the second signal, or
second information associated with the first signal is the same with the second information associated with the second signal.

The first information comprises at least one of a panel index or a set.

The second information comprises at least one of a CORESET group, a CC or a CC group.

In an embodiment, the panel index is configured in at least one of: a TCI state, a CSI report, a CORESET, a CORESET group, a CC, or a CC group.

In an embodiment, the set comprises at least one of a TCI state or an RS.

In an embodiment, the first information associated with the first signal comprises the first information associated with a TCI state applicable to the first signal.

In an embodiment, the first information associated with the second signal comprises the first information associated with a TCI state applicable to the second signal.

In an embodiment, the TCI state applicable to the first signal comprises a TCI state indicated by downlink control information, DCI, for the first signal.

In an embodiment, the TCI state applicable to the second signal comprises at least one of a TCI state indicated by DCI for the second signal, a TCI state activated by a MAC-CE for a default CORESET of the second signal, or a TCI state corresponding to the lowest codepoint in a plurality of TCI codepoints comprising a plurality of TCI states applicable to the second signal.

In an embodiment, the first information associated with the first signal comprises the first information associated with an RS applicable to the first signal.

In an embodiment, the first information associated with the second signal comprises the first information is associated with an RS applicable to the second signal.

In an embodiment, the RS applicable to the first signal comprises a QCL RS in a TCI state indicated by DCI for the first signal.

In an embodiment, the RS applicable to the second signal comprises at least one of a QCL RS in a TCI state indicated by DCI for the second signal, a QCL RS in a TCI state activated by a MAC-CE for a default CORESET of the second signal, a QCL RS in a TCI state corresponding to the lowest codepoint in a plurality of TCI codepoints comprising a plurality of TCI states applicable to the second signal, or a QCL RS applicable to a default CORESET of the second signal.

In an embodiment, the second information associated with the first signal comprises the second information associated with a CORESET scheduling the first signal.

In an embodiment, the second information associated with the second signal comprises at least one of the second information associated with a CORESET scheduling the second signal or the second information associated with a default CORESET of the second signal.

In an embodiment, the first information associated with the first signal comprises the first information associated with the second information associated with the first signal, and wherein the first information associated with the second signal comprises the first information associated with the second information associated with the second signal.

In an embodiment, the first information associated with the second information associated with the first signal comprises the first information associated with the second information associated with a CORESET scheduling the first signal.

In an embodiment, the first information associated with the second information associated with the second signal comprises at least one of the first information associated with the second information associated with a CORESET scheduling the second signal or the first information associated with the second information associated with a default CORESET of the second signal.

In an embodiment, one of the first signal or the second signal comprises at least one of a PDCCH, a PDSCH, a CSI-RS, or an aperiodic CSI-RS.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described embodiment s.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a wireless terminal, the wireless communication method comprising:
   prioritizing a reception of a first signal in response to at least one event occurring,
   wherein the first signal and a second signal overlap in at least one time unit,
   wherein the at least one event comprises first information associated with the first signal and is the same as the first information associated with the second signal,
   wherein the first information associated with the first signal comprises the first information associated with a TCI state applicable to the first signal, and
   wherein the first information associated with the second signal comprises the first information associated with a TCI state applicable to the second signal,
   wherein the TCI state applicable to the first signal comprises a TCI state indicated by downlink control information (DCI) for the first signal, and wherein the TCI state applicable to the second signal comprises at least one of a TCI state indicated by DCI for the second signal, a TCI state activated by a medium access control control element (MAC-CE), for a default CORESET of the second signal, or a TCI state corresponding to the lowest codepoint in a plurality of TCI codepoints comprising a plurality of TCI states applicable to the second signal.

2. The wireless communication method of claim 1, wherein the prioritizing the reception of the first signal comprises at least one of:
   receiving only the first signal; or
   not receiving the second signal.

3. The wireless communication method of claim 2, wherein the at least one event comprises at least one of:
   an offset between a physical downlink control channel (PDCCH) scheduling the second signal and the second signal is smaller than a threshold,
   the first signal is indicated having a transmission configuration indicator, TCI, state,
   second information associated with the first signal is the same with the second information associated with the second signal,
   wherein the first information comprises at least one of a panel index or a set, and
   wherein the second information comprises at least one of a control resource set (CORESET) group, a component carrier (CC) or a CC group.

4. The wireless communication method of claim 3, wherein the panel index is configured in at least one of: a TCI state, a channel state information (CSI) report, a CORE- SET, a CORESET group, a CC, or a CC group, or wherein the set comprises at least one of a TCI state or a reference signal (RS).

5. The wireless communication method of claim 3, wherein the first information associated with the first signal comprises the first information associated with an RS applicable to the first signal, and wherein the first information associated with the second signal comprises the first information is associated with an RS applicable to the second signal.

6. The wireless communication method of claim 5, wherein the RS applicable to the first signal comprises a QCL RS in a TCI state indicated by DCI for the first signal, and wherein the RS applicable to the second signal comprises at least one of a QCL RS in a TCI state indicated by DCI for the second signal, a QCL RS in a TCI state activated by a MAC-CE for a default CORESET of the second signal, a QCL RS in a TCI state corresponding to the lowest codepoint in a plurality of TCI codepoints comprising a plurality of TCI states applicable to the second signal, or a QCL RS applicable to a default CORESET of the second signal.

7. The wireless communication method of claim 3, wherein the second information associated with the first signal comprises the second information associated with a CORESET scheduling the first signal, and
wherein the second information associated with the second signal comprises at least one of the second information associated with a CORESET scheduling the second signal or the second information associated with a default CORESET of the second signal.

8. The wireless communication method of claim 3, wherein the first information associated with the first signal comprises the first information associated with the second information associated with the first signal, wherein the first information associated with the second signal comprises the first information associated with the second information associated with the second signal.

9. The wireless communication method of claim 8, wherein the first information associated with the second information associated with the first signal comprises the first information associated with the second information associated with a CORESET scheduling the first signal, and wherein the first information associated with the second information associated with the second signal comprises at least one of the first information associated with the second information associated with a CORESET scheduling the second signal or the first information associated with the second information associated with a default CORESET of the second signal.

10. The wireless communication method of claim 2, wherein one of the first signal or the second signal comprises at least one of a PDCCH, a physical downlink shared channel (PDSCH), a CSI-RS, or an aperiodic CSI-RS.

11. A wireless terminal, comprising:
a processor, configured for prioritizing a reception of a first signal in response to at least one event occurring, wherein the first signal and the second signal overlap in at least one time unit,
wherein the at least one event comprises first information associated with the first signal and is the same as the first information associated with the second signal,
wherein the first information associated with the first signal comprises the first information associated with a TCI state applicable to the first signal, and
wherein the first information associated with the second signal comprises the first information associated with a TCI state applicable to the second signal,
wherein the TCI state applicable to the first signal comprises a TCI state indicated by downlink control information (DCI) for the first signal, and wherein the TCI state applicable to the second signal comprises at least one of a TCI state indicated by DCI for the second signal, a TCI state activated by a medium access control control element (MAC-CE), for a default CORESET of the second signal, or a TCI state corresponding to the lowest codepoint in a plurality of TCI codepoints comprising a plurality of TCI states applicable to the second signal.

12. The wireless terminal of claim 11, further comprising a processor configured for:
prioritizing a reception of a first signal in response to at least one event occurring, wherein the first signal and a second signal overlap in at least one time unit; wherein the prioritizing the reception of the first signal comprises at least one of:
receiving only the first signal; or
not receiving the second signal.

13. A non-transitory computer program product comprising a computer-readable program medium code stored thereupon, the code, in response to being executed by a processor, causing the processor to implement the wireless communication method recited in claim 1.

* * * * *